Nov. 8, 1938.  I. N. CASSITY  2,135,743
OPTICAL INSTRUMENT
Filed March 23, 1936
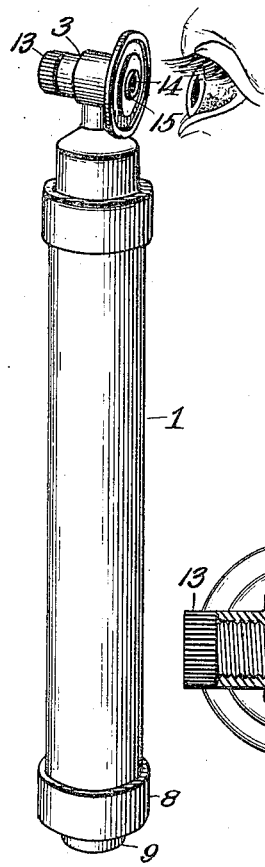
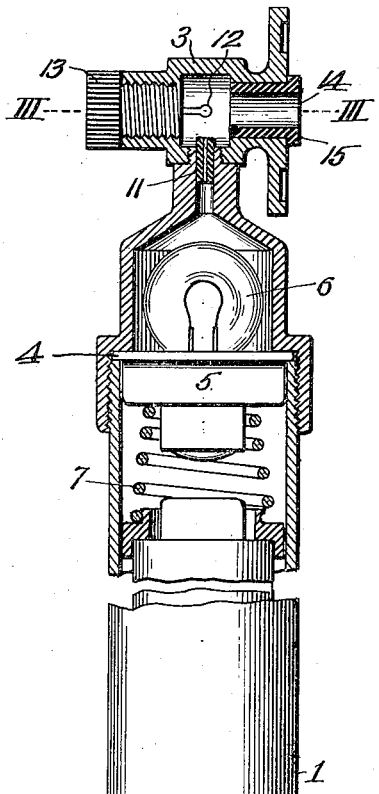
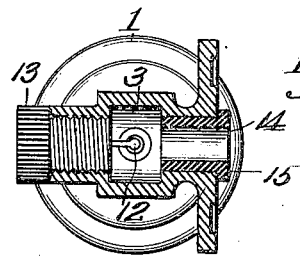
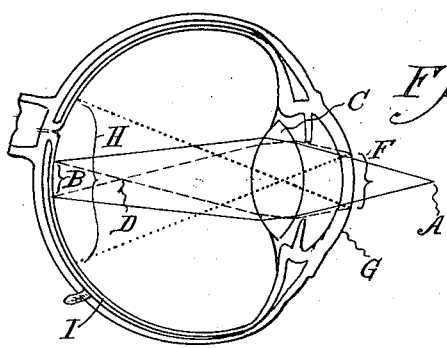
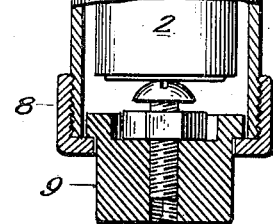
Inventor
I. N. Cassity
By Thorpe & Thorpe
Attorneys Patented Nov. 8, 1938

2,135,743

UNITED STATES PATENT OFFICE 2,135,743

OPTICAL INSTRUMENT

Isaac N. Cassity, Topeka, Kans.

Application March 23, 1936, Serial No. 70,368

2 Claims. (Cl. 88—20)

This invention relates to optical instruments for use in illuminating the hyaloid cavity of the eye with a light of greater intensity than that outside the eye, the instrument being used in a darkened room, whereby opacities in the eye of a patient may be viewed by the patient himself. The principle of the invention is to make the outer surface of the cornea a reflecting surface when the illumination in the hyaloid cavity is greater than that outside the cornea, in a manner analogous to the action of a pane of window glass at night when the room is brilliently illuminated. Under such conditions the window pane acts as a mirror.

With the instrument of the invention an image may be produced on the retina of all opacities from a point between the crystalline lens and the retina, that is, from such point through the vitreous humor, the crystalline lens, the aqueous humor of the anterior chamber, and the cornea itself. Thus muscae volitantes appear, together with cataracts or defects in the crystalline lens or imperfections in the cornea. The instrument has been used to advantage to demonstrate to a cataract patient the growth of his cataracts, and that such growth is causing his vision to grow less acute.

With the general object named in view and others as will hereinafter appear, the invention consists in certain novel and useful features of construction and combinations of parts and process or method, as hereinafter described and claimed; and in order that the invention may be fully understood, reference is to be had to the accompanying drawing in which:—

Figure 1 is a perspective view of an instrument embodying the invention as it will appear when in use.

Figure 2 is a central vertical section through the instrument.

Figure 3 is a section on the line III—III of Figure 2.

Figure 4 is a diagrammatic view of what is believed to take place within the eye of a patient when the instrument of the invention is in use.

In the said drawing, where like reference characters identify corresponding parts in all of the figures, a dark chamber having a sight-opening is provided, and the eye of the patient is brought into close proximity to the sight-opening. Inside of said dark chamber is a source of illumination 12, of relatively great brilliancy, but of very small area, the walls of the dark chamber being of light-absorbing nature as far as that area within the range of vision is concerned. As I have used the device to date, the light source creates diverging or minus waves which are not believed to be focused on the retina, since the outline of the light source cannot be viewed when looking into the device when used as shown in Figure 1. Referring to the diagrammatic figure, Figure 4, the diverging or minus waves from A (corresponding to light reflector or source 12), pass through the parts of the eye as shown by the solid lines, and produce a circle or disk of light B on the retina, which acts as a mirror and reflects said rays as converging or plus waves, as shown by the dash lines. These converging waves are believed to cross behind the crystalline lens C, as at the point D (thus creating a point where a virtual image would occur and thus acting as the apparent source of illumination). After passing the point of concentration, believed to be at or near the nodal point, the waves (see the dash lines), diverge or become minus, pass through the crystalline lens C and an image F is created on the cornea G due to the window pane effect heretofore mentioned. Cataracts and other opacities are shown in this image. Due to the fact that the crystalline lens functions similar to a camera lens, the image F is reproduced as the enlarged inverted image H, on the retina I, as shown by the dotted lines.

One method of producing the image of opacities in the eye is by the use of a large cardboard, preferably blackened on one side, and having a pin-hole opening. The blackened side of the cardboard is brought very close to the face and the observer looks from a dimly lighted room toward the daylight. The rays passing through the pin-hole are insufficient to illuminate the outside of the eye (the cardboard cutting off the light or shading the eye), and the effect above described is produced, the crystalline lens seeming to magnify the light and to illuminate the hyaloid chamber, with the result that the cornea acts as a window pane to reflect opacities, which may be observed by the experimenter. This method of viewing the eye is not as efficient as by the use of my special instrument hereinafter described.

Another method of securing a similar result, is to hold a convex reflector of small area so that it will receive light rays. The observer stands with the eye in such a position that it is not exposed to direct light rays and brings a small convex reflector so close to the eye that it is out of focus. The opacities within the eye may be observed.

From such simple experiments it is evident as mentioned above that the light permitted to reach the eye must be from a source closer to the eye than can be focused, and although the light may be brilliant, the bright the better, it must be of very small area, corresponding in principle to the pin-hole apertures used in demonstrating the straight-line propagation of light waves, as shown in physics text books. One such book is, A Text Book of Physics, Louis Bevier Spinney, 1915, The Macmillin Company, New York, pages 498 and 499.

From the above it is apparent that many different types of apparatus may be produced which will embody the inventive concept of the structure, and it is to be understood that the apparatus I shall now proceed to describe is merely by way of example, and is not to be considered as restrictive of the invention in any way. The apparatus herein illustrated has been found to be particularly efficient.

In the drawing, 1 is a tubular handle member of size to receive a flash light battery 2. One end of the handle 1 is threaded into a dark chamber 3 extending at right angles to the handle, and inserted between the bottom of said threaded chamber and the top edge of the handle is a flange portion 4 of an abutment disk 5. The disk 5 is formed with a central threaded opening receiving a light bulb 6. Inserted between the abutment 5 and the upper end of the battery 2, is an expansion spring 7. The lower end of the handle 1 is closed by a threaded cap 8 provided with a central opening through which a push-button 9 projects, and said button carries an adjustable bolt 10. Pressure on the button 9 causes the bolt to contact the bottom of the battery 2 and push the latter upwardly against the resistance of the spring 7 until the center contact of the upper end of the battery comes into electrical contact with the center terminal of the light bulb. An electric circuit through the light bulb is thus effectuated. When pressure on the button is relaxed, contact between the battery and bulb is broken by the movement of the battery away from the bulb under the impetus of the spring 7. Of course, any other source of primary illumination and control may be employed if desired.

The dark chamber 3 communicates with the chamber containing the electric light, through what may be called a pin-hole or very small opening in its side wall to limit the space illuminated in the dark chamber to a very small area. The pin-hole opening is, by preference, formed in a light absorbing bushing 11, in line with the center of illumination, the lamp 6, or other primary light source. Mounted in the dark chamber in position to receive the rays coming through the pin-hole opening is a convex reflector 12 (I have found a gold ball best because it is relatively non-tarnishable and takes a high polish), carried by a black fiber plug 13 threaded in and closing one end of the dark chamber. The other end of the dark chamber is provided with a small sight-opening 14 in line with the axis of the reflector 12, and said sight-opening is also preferably provided with a fiber bushing or lining 15 of light-absorbing nature, so that the reflected light rays will originate from the intended source, the reflector.

In order to clarify the principles of the invention, I believe it advisable to append an explanation and experiment which may be conducted with simple apparatus in proof of the foregoing explanation. The apparatus comprises a small concave mirror (to represent the retina) and any small lens or piece of transparent glass (to represent the crystalline lens of the eye). A number of ink spots are placed on the lens. Now if the lens is held closer to the eye than can be focused, the observer may look through the glass and focus distant objects, the ink spots interfering more or less with the vision, but the ink spots, themselves are not observable by the observer. Now while holding the lens in the position mentioned, bring the concave mirror into the line of vision within a half inch or so of the far side of the lens. When this concave mirror is focused, the ink spots on the lens will immediately become perfectly observable by the viewer and will be greatly magnified, reversed and distinct. The ink spots on the lens correspond to cataracts or opacities on the crystalline lens. Thus, one affected with cataracts views such from the corneal side of the lens, as it is reflected by the cornea. Because of the position of the light source, refraction and reflection of the cornea and of the lens itself, it will be evident that there are a multitude of focal points, some of which will be in focus and some not, in relation to the retina. If the eye was small and the cornea very large so that a shadow on the retina could be reflected back to the cornea, the patient could view the retina itself as well as any shadows which might be cast on the same. However, the normal eye is not constructed so that this can occur. I feel confident that the patient sees a magnified image, and not a shadow, since the optician can throw a true shadow on the patient's retina by means of an opthalmoscope and the patient cannot see it, nor realize that such shadow is being thrown on the retina.

Now, if black dots are placed on the concave mirror and it is brought in focus with the eye, the dots on the mirror will not be observed, but one merely sees a magnified image of the exterior of the eye. The crystalline lens in a like manner, must function as both a convex and concave mirror on its opposite sides, and being spaced from the cornea, produces a multitude of focal points, on both sides of the retina, and some in focus on the retina.

From the above description it will be apparent that I have produced a method of forming images of the internal structure of the eye for self-view and an apparatus for carrying out the process or method, and while I have described the method and preferred apparatus, it is to be understood that I reserve the right to all changes within the principle of the invention and without the ambit of the prior art.

I claim:—

1. A device of the character described comprising a handle member, a light absorbing casing carried by said handle member, said casing being closed at one end and having a sight opening at its other end, one wall of the casing having a pin-hole opening into the handle member at right angles to the sight opening, a small convex reflector mounted within the casing in alignment with the sight opening and with the pin-hole opening, and an illumination source in the handle in alignment with the pin-hole opening for illuminating the reflector.

2. A device of the character described comprising a handle member, a light absorbing casing carried by said handle member, said casing having a sight opening at one end, a removable light absorbing plug closing the other end of the casing, a small convex reflector carried by the plug in alignment with the sight opening, one wall of the casing having a pin-hole opening into the handle member at right angles to the line of the sight opening and in alignment with the reflector, and an illumination source in the handle member in alignment with the pin-hole opening for illuminating the reflector.

ISAAC N. CASSITY.